United States Patent
Soncodi et al.

(10) Patent No.: US 6,977,933 B2
(45) Date of Patent: Dec. 20, 2005

(54) METHODS AND SYSTEMS FOR PROVIDING SESSION INITIATION PROTOCOL (SIP) TRUNK GROUPS

(75) Inventors: Adrian Cornel Soncodi, Plano, TX (US); Peter Joseph Marsico, Chapel Hill, NC (US); Robby Darren Benedyk, Raleigh, NC (US)

(73) Assignee: Tekelec, Calabasas, CA (US)

( * ) Notice: Subject to any disclaimer, the term of this patent is extended or adjusted under 35 U.S.C. 154(b) by 0 days.

(21) Appl. No.: 10/679,808

(22) Filed: Oct. 6, 2003

(65) Prior Publication Data

US 2005/0074026 A1    Apr. 7, 2005

(51) Int. Cl.[7] .......................... H04L 12/28; H04L 12/56
(52) U.S. Cl. ....................... 370/392; 370/352; 370/522
(58) Field of Search ............................... 370/231, 229, 370/252, 355, 356, 352, 392, 389, 395.2, 370/395.5, 395.31, 395.3, 395.21, 475, 471, 370/466, 465, 395.52

(56) References Cited

U.S. PATENT DOCUMENTS

| | | | |
|---|---|---|---|
| 6,275,574 B1 | 8/2001 | Oran ..................... | 379/201.01 |
| 6,625,141 B1 | 9/2003 | Glitho et al. ............... | 370/352 |
| 2002/0131575 A1 * | 9/2002 | Gallant .................. | 379/220.01 |
| 2002/0136370 A1 * | 9/2002 | Gallant .................... | 379/90.01 |
| 2002/0141386 A1 * | 10/2002 | Minert et al. ................ | 370/352 |
| 2002/0146005 A1 | 10/2002 | Gallant et al. .............. | 370/389 |
| 2003/0158967 A1 * | 8/2003 | Tripathi et al. ............. | 709/245 |
| 2004/0121814 A1 * | 6/2004 | Creamer et al. ............ | 455/563 |
| 2004/0240381 A1 * | 12/2004 | Clark et al. ................. | 370/229 |

OTHER PUBLICATIONS

Dalgic et al., "True Number Portability and Advanced Call Screening in a SIP-Based IP Telephony System," IEEE Communications Magazine, p. 96-101, (Jul. 1999).
Rosenberg et al., "SIP: Session Initiation Protocol," Network Working Group, p. 145, (Jun. 2002).
Rosenberg et al., "Session Initiation Protocol (SIP): Locating SIP Servers," Network Working Group, p. 1-16, (Jun. 2002).

\* cited by examiner

*Primary Examiner*—Brian D. Nguyen
(74) *Attorney, Agent, or Firm*—Jenkins, Wilson & Taylor, P.A.

(57) ABSTRACT

Methods and systems for providing SIP trunk groups are disclosed. A SIP call processor identifies an incoming SIP trunk group based on one or more parameters associated with an incoming SIP message. The SIP call processor selects per-trunk-group call processing data based on the incoming SIP trunk group. The SIP call processor selectively processes the call based on the per-trunk-group call processing data selected for the incoming SIP trunk group.

40 Claims, 3 Drawing Sheets

METHODS AND SYSTEMS FOR PROVIDING SESSION INITIATION PROTOCOL (SIP) TRUNK GROUPS

TECHNICAL FIELD

The present invention relates to methods and systems for providing trunk groups in IP telephony networks. More particularly, the present invention relates to methods and systems for providing SIP trunk groups in IP telephony networks.

BACKGROUND OF THE INVENTION

In the public switched telephone network (PSTN), trunk groups are physical facilities used to carry bearer data and signaling between switching offices. Since different trunks and trunk groups are associated with different physical facilities, in the PSTN, features can be defined on a per-trunk-group basis. For example, telecommunications customers can request special features on trunk groups, such as call screening, automatic number identification, and quality of service.

In IP telephony networks, there is no analog to PSTN trunk groups. For example, SIP is used to establish multimedia communication sessions between end users over an underlying IP network. SIP involves exchanging messages between peer entities, referred to as proxy servers, to establish a multimedia communications session between the SIP end users. Unlike PSTN trunk groups where an incoming trunk group can be identified based on the trunk over which a message is received, in SIP, all messages arrive over the same signaling interface. For example, SIP messages are carried over TCP or UDP and all SIP messages arrive at port 5060. Thus, one problem with providing trunk-group-like features in a SIP network includes identifying an incoming signaling trunk.

Another problem with using SIP to create to PSTN-trunk-group-like features is that even if the trunk group can be identified, the SIP protocol specification does not specify methods for providing PSTN-trunk-group-like features.

Accordingly, there exists a long felt need in the industry for methods and systems for identifying SIP trunk groups and for selectively processing calls on a per-trunk-group basis.

DISCLOSURE OF THE INVENTION

The present invention includes methods and systems for providing SIP trunk groups. According to one aspect, the invention includes receiving a SIP call signaling message at a SIP call processing node. For example, the SIP call signaling message may be an INVITE message. Based on one or more parameters in the signaling message, an incoming SIP trunk group is identified. Once the incoming SIP trunk group is identified, the incoming trunk group is used to select per-trunk-group call processing data for the call. In one implementation, a separate per-incoming-trunk-group call processing table may be assigned to each incoming SIP trunk group. Each table contains call processing instructions for calls on the associated incoming SIP trunk group. Thus, by associating per-trunk-group call processing data with each incoming SIP trunk group, the present invention enables PSTN-trunk-group-like features to be associated with IP telephony calls.

Accordingly, it is an object of the invention to provide methods and systems for providing SIP trunk groups.

It is another object of the invention to provide methods and systems for selectively processing SIP calls on a per-incoming-trunk-group basis.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings, of which.

DETAILED DESCRIPTION OF THE INVENTION

Figure 1:
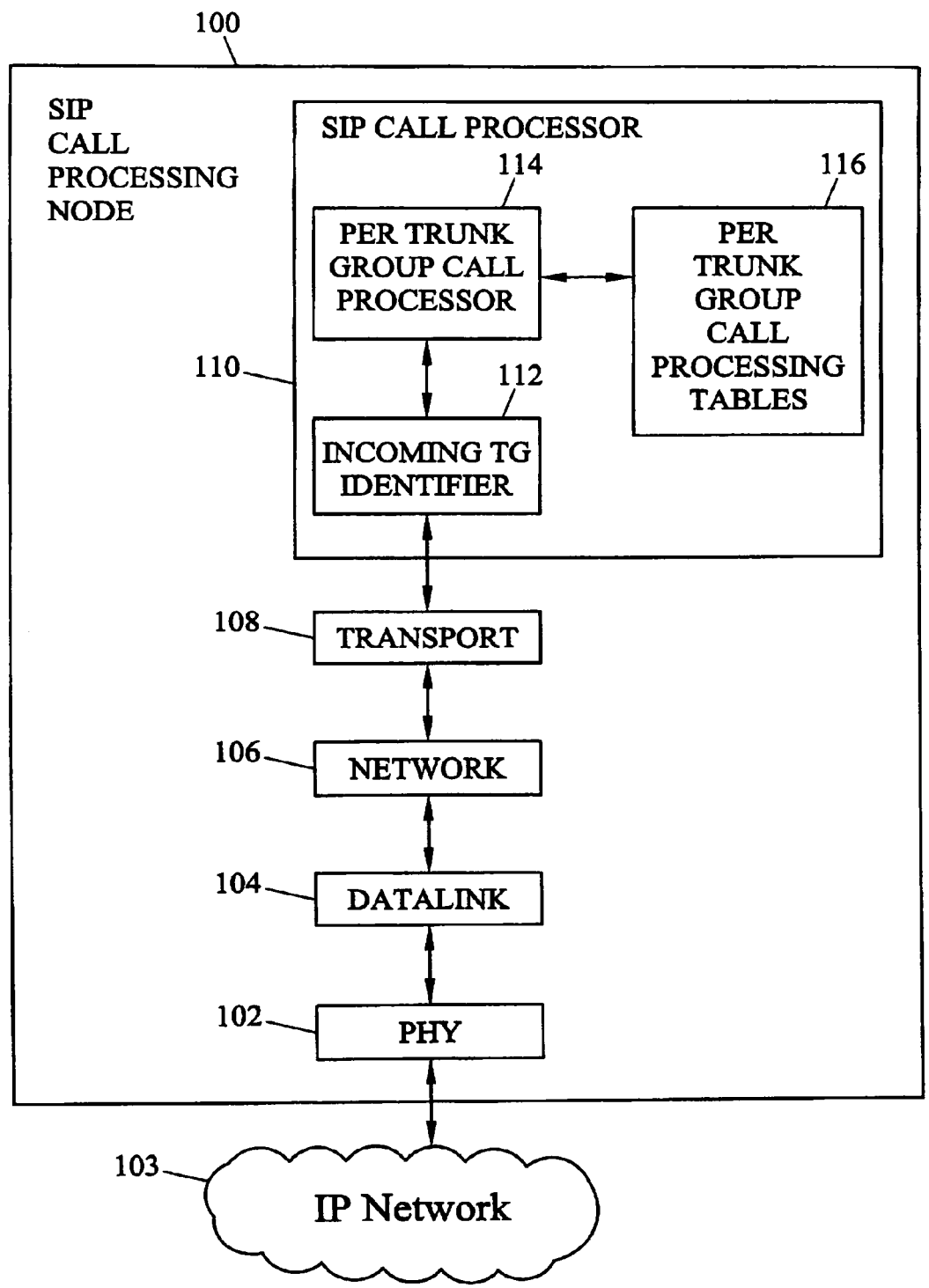
FIG. 1 is a block diagram of a SIP call processing node according to an embodiment of the present invention.

FIG. 1 is a block diagram illustrating an exemplary architecture for a SIP call processing node according to an embodiment of the present invention. Referring to FIG. 1, a SIP call processing node 100 includes a plurality of functions or processes that implement SIP trunk groups. It is understood that these functions or processes can be implemented in hardware, software, firmware, or any combination thereof. Accordingly, SIP call processing node 100 may be a general purpose computing platform including one or more microprocessors for implementing the SIP trunk group functions as described herein.

In FIG. 1, SIP call processing node 100 includes a protocol stack for communicating with other SIP call processing nodes over an external network. In the illustrated example, the protocol stack includes a physical layer 102, a data link layer 104, a network layer 106, and a transport layer 108. Physical layer 102 may include any suitable hardware and/or software for implementing OSI physical layer functions, such as sending and receiving data over a physical medium. In one example, physical layer 102 and data link layer 104 may be implemented using an Ethernet interface. An Ethernet interface controls access to the underlying medium using a carrier sense multiple access (CSMA) protocol. Retransmissions and exponential back off are used to resolve collisions on the underlying network. It is understood that such an Ethernet interface includes a MAC address that other nodes on the network use to identify the interface.

The present invention is not limited to using an Ethernet interface. Any appropriate electrical or optical interface for sending and receiving SIP messages between nodes may be used without departing from the scope of the invention. For example, in an alternate embodiment of the invention, SIP call processing node 100 may include physical and data link layers for sending and receiving data over an optical network, such as a synchronous optical network (SONET). In yet another alternate implementation, SIP call processing node 100 may include a wireless LAN interface, such as an 802.11x interface, for sending and receiving SIP messages over a wireless 802.11x network.

Network layer 106 may be any suitable network layer protocol for sending and receiving messages between non-directly connected nodes. In one example, network layer 104 may be an Internet protocol (IP) layer. According to the SIP protocol specification, SIP functions properly with both IP version 4 and IP version 6. Accordingly, network layer 106 may implement IP version 4 and/or IP version 6.

Transport layer 108 may implement any suitable reliable or unreliable transport mechanism for sending and receiving SIP messages over an underlying network. For example, transport layer 108 may implement the user datagram protocol (UDP), the transport control protocol (TCP), or the stream control transmission protocol (SCTP), as described in the correspondingly named IETF Internet Drafts and RFCs.

SIP call processor 110 includes functions for identifying SIP trunk groups and for processing calls on a per-trunk-group basis. In the illustrated example, SIP call processor 110 includes an incoming trunk group identifier 112 for identifying incoming SIP trunk groups based on one or more parameters in received SIP messages. At the limit, if there is no SIP parameter identifying the incoming trunk group, this can be done based on the source IP address and/or the transport layer port, such as the TCP, UDP, or SCTP port, of the packet. SIP call processor 110 also includes a per-trunk-group call processor for selectively processing calls based on the incoming trunk group using data stored in per-trunk-group call processing tables 116. Detailed examples of SIP trunk group identification and per-trunk-group call processing will be described below.

Figure 2:
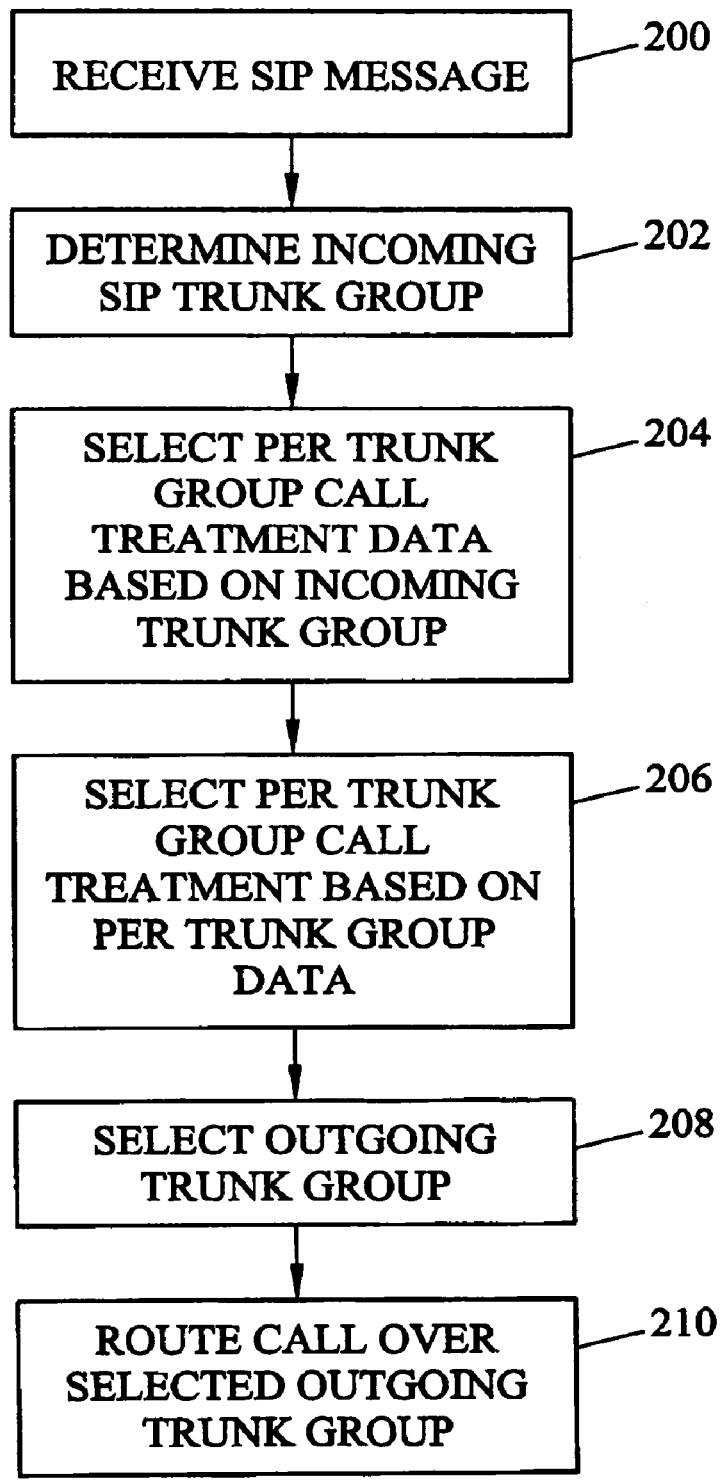
FIG. 2 is a block diagram of exemplary steps that may be performed by a SIP call processing node in identifying an incoming trunk group for a call and for selectively processing the call based on the incoming trunk group.

FIG. 2 is a flow chart illustrating exemplary steps that may be performed by SIP call processor 110 in identifying incoming SIP trunk groups and for selectively processing calls based on the incoming SIP trunk group. Referring to FIG. 2, in step 200, SIP call processor 110 receives a SIP message. For example, the SIP message may be an INVITE message from a SIP proxy server inviting a user to participate in a multimedia conference, such as a telephone call. In step 202, incoming trunk group identifier 112 of SIP call processor 110 identifies the incoming trunk group associated with the call. Identifying the incoming trunk group may include decoding the SIP message to extract one or more parameters from the SIP message and performing a lookup in a trunk group identification table based on the parameters. Exemplary SIP parameters that may be used to identify an incoming trunk group include parameters in the SIP via header, the source IP address, or proprietary extensions to the SIP message.

In step 204, once the incoming trunk group has been identified, per-trunk-group call processor 114 selects per-trunk-group call treatment data based on the incoming trunk group. For example, call processor 114 may select a per-trunk-group call processing table from tables 116 that corresponds to the particular incoming trunk group. The ability to have different processing tables for each trunk group enables different features to be associated with individual trunk groups. As a result, differential processing can be applied on a per-incoming-trunk-group basis.

Using the data in step 204, in step 206, per-trunk-group call processor 114 selects per-trunk-group call treatment based on the per-trunk-group data. Exemplary call treatments include routing to logical peer groups, load sharing, applying profiles, screening, privacy, quality of service routing, bearer capability routing, time of day routing, carrier routing, or any feature that may be associated with a PSTN trunk group.

In step 208, per-trunk-group call processor 114 selects an outgoing trunk group for the call. The outgoing trunk group may be specified in the per-trunk-group call processing data. The next node in the path may use the outgoing trunk group data to determine how the call should be treated at the next top in the call setup sequence.

Subsequent messages associated with a call for which incoming and outgoing trunk groups have been identified may be processed using the SIP call-id header. The call-id remains the same for all messages relating to a given call. As a result, when subsequent messages for a call come in, the call-id associates then with a call, which in turn has been associated with an incoming SIP trunk group when the initial INVITE was received. Because subsequent messages may not have the same via header stack, the call-id header provides a method for processing subsequent messages associated with a call on a per-trunk-group basis.

Figure 3:
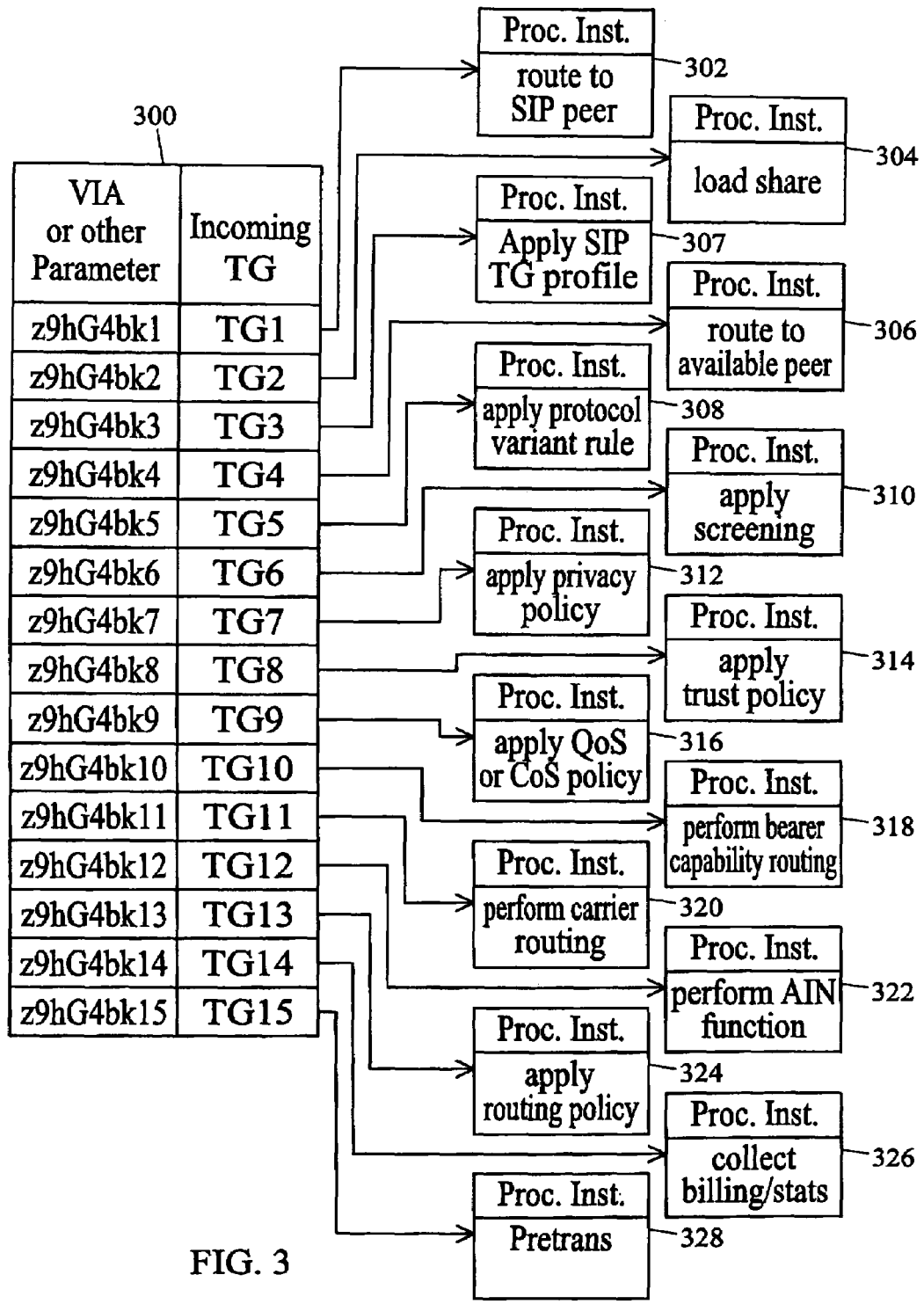
FIG. 3 is a block diagram illustrating an incoming trunk group identification table and per-trunk-group call processing tables according to an embodiment of the present invention.

FIG. 3 illustrates exemplary data that may be used to identify an incoming trunk group and per-trunk-group call processing tables according to an embodiment of the present invention. Referring to FIG. 3, an incoming trunk group identification table 300 may be used by incoming trunk group identifier 112 illustrated in FIG. 2 to identify the incoming SIP trunk group. In the illustrated example, table 300 includes a first field that lists via or other SIP parameters used to identify the incoming SIP trunk group and a second field that contains an identifier for the incoming trunk group. In the illustrated example, the via or other parameter field contains branch id parameters that are part of the SIP via header. According to the SIP protocol specification, the branch parameter value must be unique across space and time for all requests sent by a SIP user agent. The branch id must always begin with the characters z9hG4bk. These seven characters are defined in the SIP protocol specification as a cookie used by servers receiving incoming call requests to identify that the branch id was constructed according to the SIP protocol specification. The remaining characters in the branch id may be used by SIP trunk group identifier 112 to distinguish among SIP trunk groups. For example, incoming SIP trunk group identifier 112 may use the branch id in the outermost SIP via header in an incoming SIP INVITE message as a key to perform a lookup in table 300 to determine an incoming trunk group id.

In FIG. 3, each incoming trunk group is associated with one of the per-trunk-group call processing tables 116. In the illustrated example, each table 116 includes per-trunk-group call processing instructions. For example, table 302 may define peer entities at the remote end of a trunk group as members of a logical group. Accordingly, per-trunk-group call processor 114 may use the data in table 302 to route the call to one of the peer entities in the logical group. In a similar manner, table 304 may include instructions for load sharing calls among peers assigned to the particular incoming SIP trunk group.

Table 306 may define SIP peers and the operational status associated with each peer based on heartbeat messages sent to and received from each peer. The operational status may be used to determine the SIP peer to which a call assigned the particular incoming trunk group should be routed. For example, if table 306 indicates that a SIP peer associated with a particular outgoing trunk group is unavailable, then per-trunk-group call processor 114 may select an alternate trunk group based on peer availability indicated by the table. In SIP, there is no procedure specified to maintain peer status and route only to available peers. The result of routing a message to an unavailable peer in SIP may be a timeout at the originator and a retransmission. By maintaining peer availability status in per-trunk-group call processing tables, the present invention increases the likelihood that calls will be routed to available peers and thus decreases the need for such timeouts and retransmissions.

Table 307 may maintain per-trunk-group profiles. Such profiles may contain instructions as to whether or not to clear all calls associated with a particular trunk group in response to a disconnect.

Table 308 may maintain protocol variant and vendor-specific information about each peer associated with an incoming trunk group. For example, one peer associated with the incoming trunk group may support a non-standard extension of the SIP protocol. In this situation, per-trunk-group call processor 114 would use the extension specified in table 308 for the particular peer when routing calls to that peer. By defining protocol restrictions on a per-peer basis, the restrictions or proprietary extensions can be used in both directions and will only be used with appropriate peers. In standard SIP, there is no way to know the capabilities supported by a peer.

Table 310 may associate screening parameters with a particular incoming trunk group. The screening parameters may be used to block call types on certain incoming or outgoing trunk groups. For example, toll calls may be blocked for certain incoming trunk groups.

Per-trunk-group call processing table 312 may apply a privacy policy based on the incoming or outgoing trunk group. For example, table 312 may define a plurality of outgoing trunk groups associated with the incoming trunk group. Each outgoing trunk group may be associated with a SIP peer. Different privacy policies may be applied depending on the SIP peer.

Table 314 may specify a plurality of SIP peers to which a call can be routed and whether each SIP peer is trusted or non-trusted. If the SIP peer is trusted, table 314 may simply specify that the call should be routed normally over that trunk group. If the SIP peer is defined as non-trusted, table 314 may specify that the calling party number be hidden or removed from signaling messages sent to the non-trusted peer.

Table 316 may apply a quality of service or cost of service routing policy based on the incoming or outgoing trunk group. For example, certain calls, such as 911 calls, may be routed with higher priority. Per-trunk-group call processor 114 may use data in Table 316 to select an outgoing trunk group from a group of outgoing trunk groups associated with the call destination. If the destination is a priority destination, such as a 911 destination, the call may be routed with higher priority or over a high-speed trunk group. Similarly, if the incoming trunk group that resulted in selection of table 316 is identified by table 316 to be a high priority trunk group, such calls may be routed with higher priority.

Table 318 may apply different bearer capabilities on a per-trunk-group basis. For example, different codecs and packetization methods may be associated with different outgoing trunk groups and/or peers associated with an incoming trunk group. For example, once the incoming trunk group is used to select table 318, an outgoing trunk group may be selected from table 318. Table 318 may specify the codec or packetization method for the selected outgoing trunk group. Thus, table 318 allows codecs and packetization methods to be individually associated with each outgoing trunk group or peer.

Table 320 may contain instructions for associating carrier capability routing with certain trunk groups. Certain routes may be accessible through several peers. However, the call-id or other SIP parameters may determine the service provider or peer to which the call should be routed. For example, a service provider from which a call is established may have agreements for favorable tariffs with certain carriers. Table 320 may contain instructions to preferentially select outgoing trunk groups associated with carriers with which the originating carrier has favorable routing or tariff agreements.

Table 322 may include AIN functions to be associated with an incoming trunk group. Examples of AIN functions may include LNP, C-NAM, and free phone. When an incoming call results in selection of table 322, an AIN function may be triggered. For example, for the LNP case, table 322 may trigger per-trunk-group call processor 114 to formulate an LNP query to an LNP database. The LNP database may respond by providing a routing number corresponding to the dialed digits in the received call signaling message. Per-trunk-group call processor 114 may insert the routing number in the call signaling message and route the message to the network corresponding to the routing number.

Table 324 may include routing policies to be applied on a per-trunk-group basis. Examples of routing policies may include policies based on operational status, current load or congestion, and time of day. For example, the owner of an organization associated with a particular incoming trunk group may desire to allow toll calls during a certain time of day, such as during business hours. Another organization may not have such restrictions. Per-trunk-group call processing tables, such as table 320, allow such differentiated treatment on a per-trunk-group basis.

Table 326 may include instructions for collecting certain billing or accounting information for a particular trunk group. For example, table 326 may contain instructions for generating call detail records for IP telephony calls. Such CDRs may include the sequences of signaling messages used to establish, maintain, and release a call. These CDRs may be stored in a database and used for billing purposes.

Table 328 may include instructions for associating pre-translation, translation, and routing functions with the trunk group. Routing may be based on pattern matching, as with traditional trunk groups. However, the scheme associated with SIP trunk groups may be much more elaborate, involving the mix of successive translations, intercepts, processing, and even collecting new digits and starting over. For example, table 328 may route calls for a particular incoming trunk group to an IVR server for digit collection and automated services.

The per-trunk-group processing tables illustrated in FIG. 3 are merely illustrative of the types of SIP processing that may be performed on a per incoming trunk group basis. Combinations of the processing instructions in tables 116 may be applied to any of the incoming trunk groups without departing from the scope of the invention. In addition, while the invention has been described in terms of per-trunk-group call processing tables, the present invention is not limited to storing the per-trunk-group call processing instructions in a table format. Any suitable data structure for storing the per-trunk-group call processing data is intended to be within the scope of the invention. Using a data-driven approach allows features associated with incoming trunk groups to be changed without re-compiling source code. Thus, by identifying the incoming trunk group and enabling per-trunkgroup processing instructions, the present invention allows PSTN-like-trunk-group features to be implemented in a SIP environment.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for implementing session initiation protocol (SIP) trunk groups on a per call basis, the method comprising:
   (a) receiving a first SIP signaling message associated with a new call;
   (b) identifying an incoming SIP trunk group for the new call;
   (c) selecting, based on the incoming SIP trunk group, a first set of per-trunk-group call processing data from a plurality of sets of different call processing data associated with different incoming SIP trunk groups; and
   (d) processing the new call using the first set of per-trunk-group call processing data.

2. The method of claim 1 wherein receiving a first SIP signaling message includes receiving a SIP INVITE message.

3. The method of claim 1 wherein identifying an incoming SIP trunk group for the new call includes examining a via header in the first SIP signaling message and selecting the incoming SIP trunk group based on the via header.

4. The method of claim 1 wherein identifying an incoming SIP trunk group for the new call includes decoding a predetermined extension from the SIP message and selecting the incoming SIP trunk group based on the extension.

5. The method of claim 1 wherein identifying an incoming SIP trunk group for the new call includes determining a source IP address of the first SIP signaling message and selecting the incoming SIP trunk group based on the source IP address.

6. The method of claim 1 wherein processing the new call using the first set of per-trunk-group call processing data includes routing the new call to a SIP peer in a SIP logical peer group associated with the incoming trunk group by the first set of per-trunk-group call processing data.

7. The method of claim 1 wherein processing the new call using the first set of per-trunk-group call processing data includes routing the new call to a peer of a redundant set of peers associated with the incoming trunk group by the first set of per-trunk-group call processing data.

8. The method of claim 1 wherein processing the new call using the first set of per-trunk-group call processing data includes routing the new call to a SIP peer based on operational status information regarding SIP peers associated with the incoming trunk group by the first set of the per-trunk-group call processing data.

9. The method of claim 1 wherein processing the new call using the first set of per-trunk-group call processing data includes processing the new call based on profiles associated with the incoming trunk group by the first set of per-trunk-group call processing data.

10. The method of claim 1 wherein processing the new call using the first set of per-trunk-group call processing data includes processing the new call based on protocol variant information and vendor-specific information regarding a SIP peer associated with the incoming trunk group by the first set of per-trunk-group call processing data.

11. The method of claim 1 wherein processing the new call using the first set of per-trunk-group call processing data includes screening the new call using call screening parameters associated with the incoming SIP trunk group by the first set of per-trunk-group call processing data.

12. The method of claim 1 wherein processing the new call using the first set of per-trunk-group call processing data includes processing the new call based on a privacy policy associated with the incoming trunk group by the first set of per-trunk-group call processing data.

13. The method of claim 1 wherein processing the new call using the first set of per-trunk-group call processing data includes selecting an outgoing trunk group from a plurality of outgoing trunk groups associated with the incoming trunk group by the first set of per-trunk-group call processing data.

14. The method of claim 1 wherein processing the new call using the first set of per-trunk-group call processing data includes applying quality of service routing to the call using QoS parameters specified for the incoming trunk group in the first set of per-trunk-group call processing data.

15. The method of claim 1 wherein processing the new call using the first set of per-trunk-group call processing data includes processing the new call based on bearer capability routing defined for the incoming trunk group in the first set of per-trunk-group call processing data.

16. The method of claim 1 wherein processing the new call using the first set of per-trunk-group call processing data includes processing the new call based on carrier routing defined for the incoming trunk group in the first set of per-trunk-group call processing data.

17. The method of claim 1 wherein processing the new call using the per-trunk-group call processing data includes processing the new call based on an advanced intelligent network function associated with the incoming trunk group by the first set of per-trunk-group call processing data.

18. The method of claim 1 wherein processing the new call using the per-trunk-group call processing data includes processing the new call based on routing policies defined for the incoming trunk group in the first set of per-trunk-group call processing data.

19. The method of claim 1 wherein processing the new call using the first set of per-trunk group call processing data includes generating customized billing information specified for the incoming trunk group in the first set of per-trunk-group call processing data.

20. The method of claim 1 comprising receiving a second SIP signaling message associated with a second new call, identifying a different incoming SIP trunk group for the second signaling message, selecting a second set of per-trunk-group call processing data using the incoming trunk group identified for the second SIP signaling message, and processing the second new call using the second set of per-trunk-group call processing data.

21. A session initiation protocol (SIP) call processor comprising:
   (a) an incoming trunk group identifier for identifying an incoming SIP trunk group associated with a first SIP call based on one or more parameters in a first SIP signaling message received for the first call;
   (b) a per-trunk-group call processor operatively associated with the incoming trunk group identifier for implementing per-incoming-trunk-group call processing based on the incoming SIP trunk group identified for each received call; and
   (c) a plurality of per-trunk-group call processing data sets usable by the per-trunk-group call processor for applying differentiated processing for calls on different incoming SIP trunk groups, each of the per-trunk-group call processing data sets being assigned to an incoming SIP trunk group and containing instructions for processing calls from the assigned incoming SIP trunk group, wherein the per-trunk group call processor is adapted to select a first per-trunk-group call processing data set for processing the first call and to process the first call using data in the first per-trunk-group call processing data set.

22. The SIP call processor of claim 21 wherein the incoming trunk group identifier is adapted to identify the incoming SIP trunk group for the first call based on a predetermined parameter in a via header of the first SIP signaling message.

23. The SIP call processor of claim 21 wherein the incoming trunk group identifier is adapted to identify the incoming SIP trunk group for the first call based on a SIP extension in the first SIP signaling message.

24. The SIP call processor of claim 21 wherein the incoming trunk group identifier is adapted to identify the incoming SIP trunk group for the first call based on a source IP address associated with the first SIP signaling message.

25. The SIP call processor of claim 21 wherein the per-trunk-group call processor is adapted to route the first call to a peer SIP entity based on peer entities defined for the incoming SIP trunk group for the first call in the first per-trunk-group call processing data set.

26. The SIP call processor of claim 21 wherein the per-trunk-group call processor is adapted to route the first call to a peer among a set of redundant peers defined for the incoming SIP trunk group for the first call in the first per-trunk-group call processing data set.

27. The SIP call processor of claim 21 wherein the per-trunk-group call processor is adapted to route the first call to an available peer associated with the incoming SIP trunk group identified for the first call based on peer entity status maintained in the first per-trunk-group call processing data set.

28. The SIP call processor of claim 21 wherein the per-trunk-group call processor is adapted to perform call screening for the first call based on call screening parameters in the first per-trunk-group call processing data set.

29. The SIP call processor of claim 21 wherein the per-trunk-group call processor is adapted to apply a privacy policy to the first call based on a privacy policy defined in the first per-trunk-group call processing data set.

30. The SIP call processor of claim 21 wherein the per-trunk-group call processor is adapted to identify trusted peers associated with an originator of the first call based on the first per-trunk-group call processing data set.

31. The SIP call processor of claim 21 wherein the per-trunk-group call processor is adapted to apply a quality of service (QoS) or a cost of service (CoS) routing policy based on data specified for the incoming trunk group in the first per-trunk-group call processing data set.

32. The SIP call processor of claim 21 wherein the per-trunk-group call processor is adapted to apply bearer capability routing based on bearer capabilities defined for outgoing trunk groups associated with the incoming trunk group for the first call in the first per-trunk-group call processing data set.

33. The SIP call processor of claim 21 wherein the per-trunk-group call processor is adapted to apply a carrier routing policy based on carrier routing parameters defined for the incoming trunk group identified for the first call in the first per-trunk-group call processing data set.

34. The SIP call processor of claim 21 wherein the per-trunk-group call processor is adapted to perform predetermined advanced intelligent network (AIN) functions for the first call based on AIN functions defined for the incoming trunk group identified for the first call in the first per-trunk-group call processing data set.

35. The SIP call processor of claim 21 wherein the per-trunk-group call processor is adapted to apply a routing policy to the first call using the first per-trunk-group call processing data set.

36. The SIP call processor of claim 21 wherein the per-trunk-group call processor is adapted to collect accounting information for the first call specified for the incoming trunk group in the first per-trunk-group call processing data set.

37. The SIP call processor of claim 21 wherein the per-trunk-group call processor is adapted to route the first call to an interactive voice response (IVR) server for digit collection and announcements based on the first per-trunk-group call processing data set.

38. The SIP call processor of claim 21 wherein the incoming trunk group identifier is adapted to identify an incoming trunk group for a second call based on a second received SIP signaling message, and wherein the per-trunk-group call processor is adapted to select a second per-trunk-group call processing data set for processing the second call based on the incoming SIP trunk group identified for the second call and to process the second call differently from the first call using the second per-trunk-group call processing data set.

39. The method of claim 1 comprising maintaining operational status of SIP peers based on heartbeat messages sent to and received from each peer.

40. The method of claim 39 wherein processing the new call includes selecting an outgoing trunk group for the new call based on the operational status maintained for each peer.

* * * * *